UNITED STATES PATENT OFFICE.

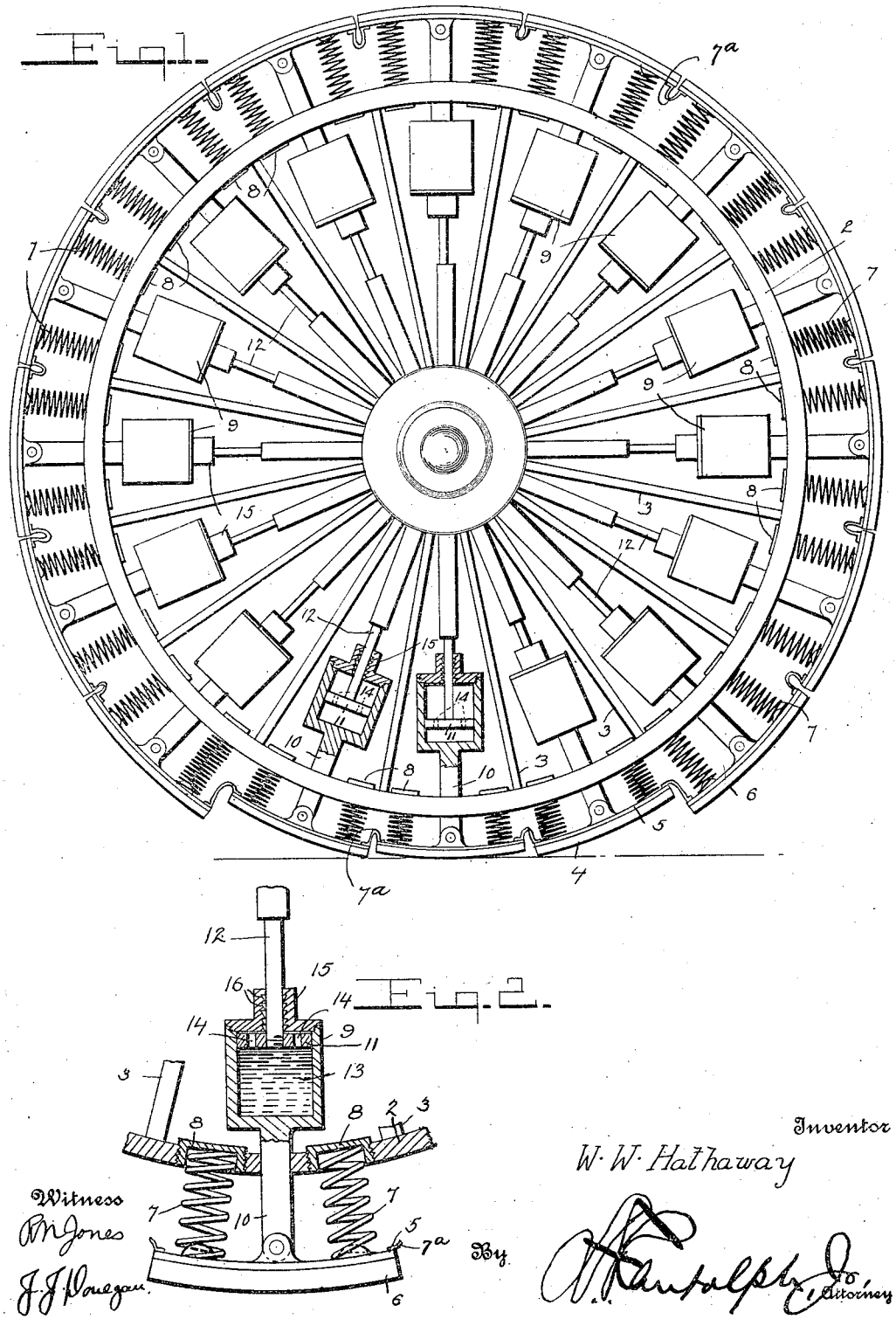

WALTER W. HATHAWAY, OF CAMBRIDGE, MASSACHUSETTS.

RESILIENT WHEEL.

1,245,910.      Specification of Letters Patent.      Patented Nov. 6, 1917.

Application filed October 24, 1916. Serial No. 127,376.

*To all whom it may concern:*

Be it known that I, WALTER W. HATHAWAY, a citizen of the United States, residing at Cambridge, in the county of Middlesex and State of Massachusetts, have invented certain new and useful Improvements in Resilient Wheels; and I do hereby declare the following to be a full, clear, and exact description of the invention, such as will enable others skilled in the art to which it appertains to make and use the same.

This invention relates to improvements in resilient wheels of the type that are devoid of pneumatic tires, and having a tread portion formed of sections, and an object of the invention is to incorporate in a wheel of this type certain novel constructions which will render the wheel more durable and increase the cushioning efficiency of the wheel.

Another object of the invention is to associate with each section of the tread a novel type of resisting device consisting of a cylinder having connection with the adjacent tread and movable therewith and having liquid therein and a piston operable within the cylinder and having a rod connected to the hub, the said piston having ports therein to admit of the piston dispersing the liquid during the travel of the cylinder in either direction, and a novel type of trapping means for trapping any liquid that may escape from the cylinder during the rotation of the wheel.

Other objects will appear and be better understood from that embodiment of my invention of which the following is a specification, reference being had to the accompanying drawing forming a part thereof, in which:

Figure 1 is a side elevation of the wheel with certain of the cylinders in section, Fig. 2 is a detail sectional view of a portion of the rim of the wheel, showing one of the tread sections associated therewith and the adjacent cylinder and piston in section.

Referring to the drawing in detail, the wheel is shown as consisting of a hub portion 1, rim 2, and spokes 3 for connecting the hub to the rim 2. Disposed in spaced relation with the rim 2 of the wheel, and concentric therewith, is a tread portion consisting of a plurality of relatively movable sections 4, each section being formed of an arcuate shaped plate 5, having its outer face covered with a rubber strip 6. The adjacent ends of adjacent tread sections are connected by means of a web 7ª, formed of flexible material. Interposed between each of the sections 4 of the tread and the rim 2 is a pair of coiled springs 7, which have their inner ends received by flanged caps 8, which are threadedly mounted in openings formed in the rim 2, the outer ends of the springs 7 having connection with the plate 5 of the adjacent tread section 4, in any suitable manner. As each tread section is forced inwardly, upon engagement with the ground, the springs 7 will be compressed and upon the withdrawal of the mentioned tread section from engagement with the ground, the springs 7 will return the tread section to normal position.

Located between adjacent spokes are cylinders 9, each of which has one end provided with an extension 10, which loosely extends through an opening in the rim 2, and has its outer end pivotally connected to the plate 5 of the adjacent tread section 4. As each tread section 4 is moved inwardly, when brought into engagement with the ground, the adjacent extension 10 and cylinder 9 will move in a radial direction toward the hub 1 of the wheel. Each cylinder 9 has a piston head 11 located therewithin, and the said piston head in each cylinder is provided with a rod 12, which extends through the inner head of the cylinder and is terminally connected, in any suitable manner, with the hub 1 of the wheel. The cylinders 9 contain liquid, preferably oil, the said liquid being designated by the numeral 13, and the pistons in the respective cylinders are provided with ports 14 for the passage of the liquid past the pistons during the travel of the cylinders in either direction, so that the liquid will not obstruct movement of the cylinder. As each tread section 4 is moved inwardly, toward the rim 2, when brought into engagement with the ground, the adjacent extension 10 will be moved inwardly and move the adjacent cylinder 9 toward the hub 1. This inward movement of the cylinder 9 will cause the outer end of the cylinder to be brought nearer the piston 11, thereby decreasing the space between the piston and the outer head of the cylinder, as shown in Fig. 1, and causing the liquid to be forced from the space between the piston and the outer end of the cylinder, through the port 14 and in rear of the piston. The liquid in the cylinders retards inward movement of the cylinders during the inward movement of the tread sections, so that a maximum cushioning effect will be had during the inward movement of the tread section. As each tread section is drawn from engagement with the ground, the adjacent springs 7, which were compressed during the inward movement of the adjacent tread section, will return the mentioned tread section, and the adjacent cylinder 9, to normal position.

The inner heads of the cylinders 9 are provided with sleeves 15, through which the piston rods 12 extend, and the inner surface of each sleeve 15 is provided with a plurality of spaced circular ribs 16, the spaces between the ribs forming trapping grooves so as to trap any of the liquid which may escape from the cylinders through the openings in the inner heads of the cylinders which receive the piston rods and prevent the escaped oil from spurting out through the sleeve 15.

It is evident that various changes might be resorted to in the construction, form and arrangement of the several parts without departing from the spirit and scope of the invention as claimed.

What I claim is:

1. A vehicle wheel of the class described consisting of a hub, a rim, cylinders interposed between the rim and the hub and adapted to contain liquid, pistons located within the cylinders and having ports therein, rods carried by the pistons and extending through the inner ends of the cylinders and connected to the hub, a tread portion encircling the rim and spaced therefrom and formed of relatively movable sections, and means connecting the cylinders to the sections of the tread so as to effect inward movement of the cylinders upon the inward movement of the tread sections and resilient elements interposed between the rim and the tread sections, for the purpose specified.

2. A vehicle wheel of the class described comprising a hub, a rim, cylinders interposed between the hub and the rim and adapted to contain liquid, pistons located within the cylinders and having ports therein, rods connected to the pistons and the hub, a tread portion encircling the rim in spaced relation thereto and formed of relatively movable sections, means for connecting the cylinders to the sections of the tread so as to effect inward movement of the cylinders upon inward movement of the tread sections, and resilient members interposed between the rim and the tread sections, for the purpose specified.

3. A vehicle wheel including a movable tread, cylinders operatively connected to the tread and movable therewith and adapted to contain liquid, sleeves carried by the cylinders having internal liquid trapping grooves, pistons positioned within the cylinders and having ports therein, and hub-carried rods extending through the sleeves and into the cylinders and secured in the pistons.

4. A vehicle wheel comprising a hub, a rim, said rim having openings therein, cylinders interposed between the rim and the hub and adapted to contain liquid, pistons located within the cylinders and provided with ports, rods carried by the pistons and extending through the inner walls of the cylinders and connected to the hub, a tread portion encircling the rim and in spaced relation thereto and formed of relatively movable sections, extensions carried by the cylinders and slidably mounted through the openings in the rim and having connection with the sections of the tread portion so as to effect inward movement of the cylinders upon inward movement of the pistons of the tread portions, and springs interposed between the rim and the sections of the tread portion, for the purpose specified.

In testimony whereof I affix my signature in presence of two witnesses.

WALTER W. HATHAWAY.

Witnesses:
CHARLES F. HATHAWAY,
FREDERIC L. FISCHER.

Copies of this patent may be obtained for five cents each, by addressing the "Commissioner of Patents, Washington, D. C."